Figure 2:
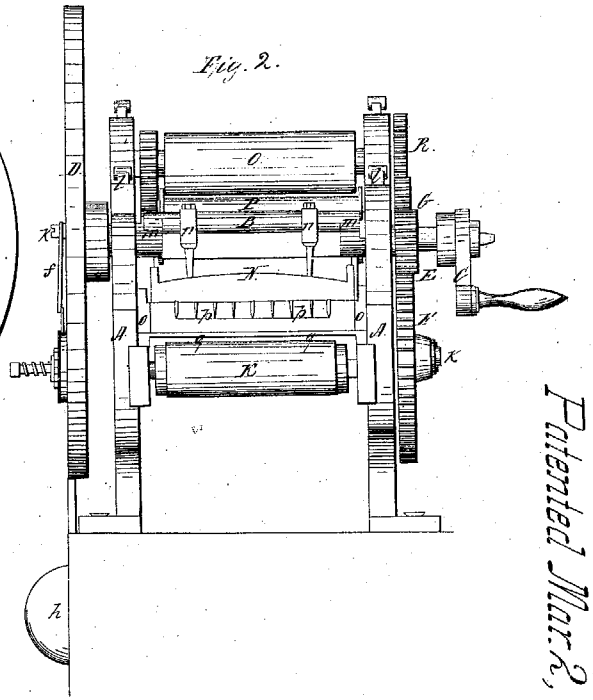
Figure 1:
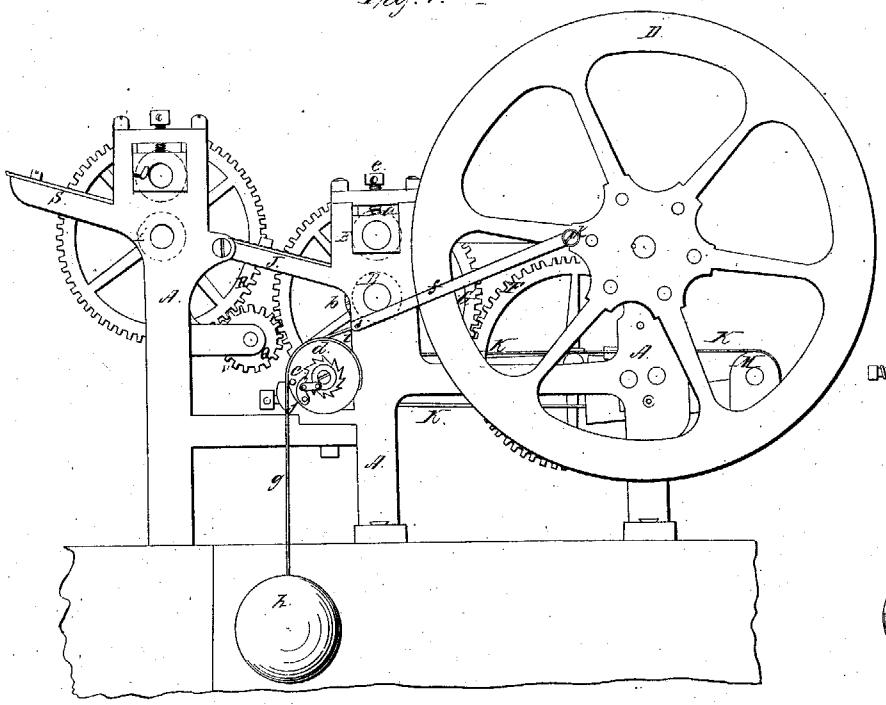

9458X.

Sheet 1 2 Sheets.

W. R. Nerins,

Cracker Machine,

Patented Mar. 2, 1836.

N. PETERS, PHOTO-LITHOGRAPHER, WASHINGTON, D.C.

Sheet 2-2 Sheets.
9458 X
W. R. Nerins,
Cracker Machine,
Patented Mar. 2, 1836.
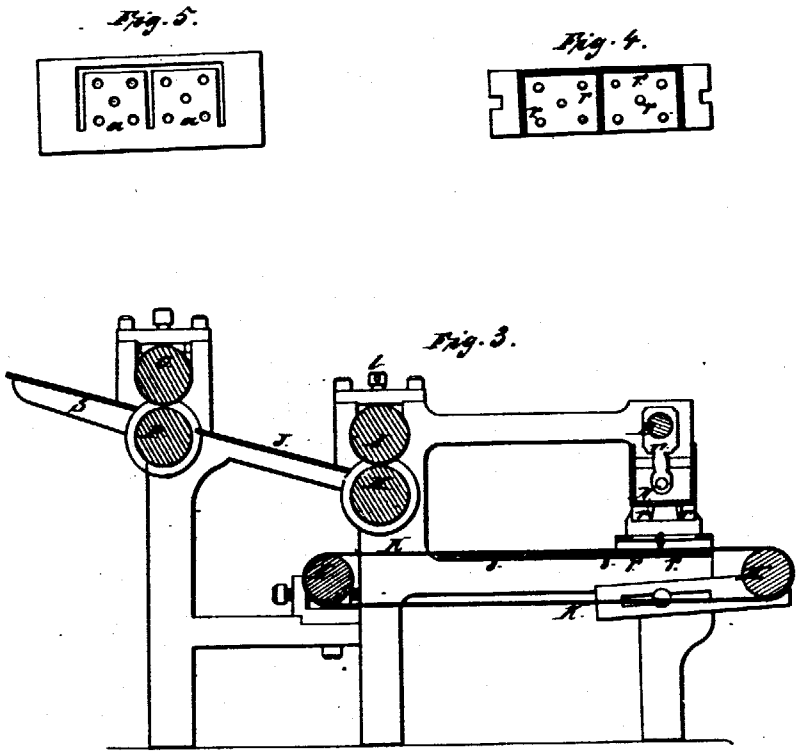
N. PETERS, PHOTO-LITHOGRAPHER, WASHINGTON, D. C.

3/2/1836 9458X

{Re-issued, May 9th 1843}

Mar. 2. 1836

William R. Nevens of New York City
Letters Patent

The Schedule referred to in these Letters Patent and making part of the same containing a description in the words of the said William R. Nevens himself of his improvement in the machine for rolling Dough & cutting Crackers & Biscuits To all to whom these presents shall come or may concern. I William R. Nevens of the City and County of New York in the State of New York, send Greeting.

Be it known that I the said William R. Nevens, have invented and applied a new and useful improvement in the construction of machinery for rolling and cutting of Crackers and biscuit, and that the following is a full and accurate description of the construction and operation of the said machinery as invented and improved by me. A perpendicular frame made of four posts, each post being about eight inches wide and six inches thick and about twelve feet high to be made of either wood or iron or other durable material. In this frame are to be fixed four horizontal rollers made of any suitable material to roll the dough to its proper thickness. If desirable an additional number of rollers may be added these rollers to be connected by cog wheels, with a carrier cog wheel on a running pinion attached to the frame, and having a fly wheel at one end to drive the machinery. If the machinery be driven by Horse or Steam power a drum is to be placed where the fly wheel is running or connected with it or other suitable part in such way as to give motion to the machinery, connected with the above mentioned running pinion, by a cog wheel is a horizontal shaft having three or more arms with a rack and pinion or other motion to drive the cutters in a perpendicular slide, to the lower end of which slide the cutters are secured which by falling on the dough, cut the crackers or biscuit. The dough to be carried to and from the cutters upon an apron made of any suitable material or upon a portable table to be connected with the machinery. The cutters are to be made with clearers to clear themselves, and to be connected together in alternate rows.

What I particularly claim as an improvement is the peculiar arrangement of the above described machinery by which the operation of rolling the dough and cutting the biscuit or crackers is connected and performed at the same time, and with the same machine. I also claim as an improvement the horizontal shaft rack or pinion by which motion is given to the cutters.

New York December 26th 1835.

Witnesses
J. S. Carpentier
C. Rutledge Carpentier

William. R. Nivens.

Exd
HT.

S.S.D. [illegible]

Patented 2d March 1836

(Recd. & Recorded anew July 9. 1838.)

Drawing